United States Patent
Mori (10) Patent No.: US 7,705,714 B2
(45) Date of Patent: Apr. 27, 2010

(54) WHEEL POSITION DETECTING DEVICE THAT PERFORMS DEDICATED LOCAL COMMUNICATION FOR EACH WHEEL AND TIRE AIR PRESSURE DETECTING DEVICE INCLUDING THE SAME

(75) Inventor: Masashi Mori, Oobu (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 224 days.

(21) Appl. No.: 11/902,070

(22) Filed: Sep. 18, 2007

(65) Prior Publication Data

US 2008/0074248 A1 Mar. 27, 2008

(30) Foreign Application Priority Data

Sep. 19, 2006 (JP) .............................. 2006-253044

(51) Int. Cl.
*B60Q 1/00* (2006.01)

(52) U.S. Cl. .................. 340/438; 340/447; 340/825.49; 340/825.36

(58) Field of Classification Search ................. 340/438, 340/442–445, 447–448, 527.7, 825.49, 539, 340/825.36
See application file for complete search history.

(56) References Cited

U.S. PATENT DOCUMENTS

| 5,602,524 | A | | 2/1997 | Mock et al. |
| 6,062,072 | A | * | 5/2000 | Mock et al. ................ 73/146.5 |
| 6,304,172 | B1 | * | 10/2001 | Katou et al. ................ 340/445 |
| 6,362,733 | B1 | * | 3/2002 | Momose et al. ............. 340/447 |
| 6,941,803 | B2 | | 9/2005 | Hirohama et al. |
| 6,963,274 | B2 | * | 11/2005 | Saheki et al. ................ 340/447 |
| 7,015,801 | B1 | | 3/2006 | Juzswik |
| 7,173,521 | B2 | * | 2/2007 | Yamazaki .................... 340/442 |
| 7,253,726 | B2 | * | 8/2007 | Okubo ....................... 340/447 |
| 7,388,478 | B2 | * | 6/2008 | Watabe ....................... 340/442 |
| 2004/0172179 | A1 | | 9/2004 | Miwa |
| 2004/0217854 | A1 | | 11/2004 | Hirohama et al. |
| 2006/0006992 | A1 | | 1/2006 | Daiss et al. |

FOREIGN PATENT DOCUMENTS

| CN | 1521027 | 8/2004 |
| JP | 3212311 | 7/2001 |
| JP | 2004-224160 | 8/2004 |
| JP | 2005-335654 | 12/2005 |

OTHER PUBLICATIONS

Chinese Office Action dated May 22, 2009, issued in corresponding Chinese Application No. 200710182164.0, with English translation.

* cited by examiner

*Primary Examiner*—Daniel Previl
(74) *Attorney, Agent, or Firm*—Nixon & Vanderhye PC (57) ABSTRACT

A wheel position detecting device and a tire air pressure detecting device including the wheel position detecting device are provided. The wheel position detecting device includes triggering devices and a receiver mounted on the vehicle-body side, and transmitters mounted on the wheels. Each triggering device outputs a trigger signal to each transmitter. In response to the trigger signal, each transmitter transmits a frame to the receiver. The receiver receives the frame and judges whether the transmitter is mounted on a subject wheel, based on whether reception strength indicated by reception strength data stored in the frame is within a range set in advance.

7 Claims, 5 Drawing Sheets

WHEEL POSITION DETECTING DEVICE THAT PERFORMS DEDICATED LOCAL COMMUNICATION FOR EACH WHEEL AND TIRE AIR PRESSURE DETECTING DEVICE INCLUDING THE SAME

CROSS-REFERENCE TO RELATED APPLICATION

This application is based on and claims the benefit of priorities from earlier Japanese Patent Application No. 2006-253044 filed on Sep. 19, 2006 the description of which is incorporated herein by reference.

BACKGROUND OF THE INVENTION

1. Field of the Invention

The present invention relates to a wheel position detecting device that detects a position on a vehicle to which a wheel is attached. In particular, the wheel position detecting device is preferably applied to a tire air pressure detecting device that detects tire air pressure.

2. Description of the Related Art

Conventionally, a direct-type tire air pressure detecting device is known as a tire air pressure detecting device. In the direct-type tire air pressure detecting device, a transmitter including a sensor, such as a pressure sensor, is directly mounted on a wheel side of a vehicle. A tire is attached to the wheel. An antenna and a receiver are provided on the vehicle-body side. The tire air pressure detecting device operates as follows. After the transmitter transmits a detection signal from the sensor, the receiver receives the detection signal, via the antenna, and the tire air pressure detecting device performs tire air pressure detection.

The direct-type tire air pressure detecting device such as this adds identification (ID) information (identifier) to data transmitted from the transmitter so that whether the transmitting data is that of the vehicle on which the tire air pressure detecting device is mounted (own vehicle) and the wheel on which the transmitter is mounted can be determined. The ID information is used to determine whether the vehicle is the own vehicle or another vehicle. The ID information is also used to determine the wheel on which the transmitter is mounted. The ID information is registered to the receiver in advance. When the data transmitted from the transmitter is received, the tire air pressure detecting device determines the wheel to which the data belongs using the received ID information (refer to, for example, Japanese Patent No. 3212311).

When a user himself changes the position of the wheel, such as through tire rotation, the tire air pressure detecting device cannot respond to the change in the wheel position unless the ID information of the wheels of which the tires have been rotated by the user is read and, the read ID information is registered to the receiver over current ID information.

SUMMARY OF THE INVENTION

In light of the above-described issues, an object of the present invention is to provide a wheel position detecting device and a tire air pressure detecting device using the wheel position detecting device, that is able to automatically respond to changes in the wheel positions (a first aspect of the this invention) and to be less affected by differences among vehicle types and the like, so the apparatus can accurately perform wheel position detection (a second aspect of this invention) (refer to the heading description in "DETAILED DESCRIPTION OF THE PREFERRED EMBODIMENTS").

To achieve the above-described object, the invention provides a wheel position detecting device and a tire air pressure detecting device using the wheel position detecting device. The wheel position detecting device includes transmitters, a receiver, and triggering devices. The transmitters are mounted on the wheels. The receiver is mounted on the vehicle body. The triggering devices are mounted on the vehicle body and are provided for each wheel.

The receiver includes a second controlling unit. The second controlling unit includes an instructing means and a judging means. The instructing means selects a wheel among a plurality of wheels as a wheel position detection subject wheel. The instructing means makes the triggering device corresponding with the subject wheel output a trigger signal that can only be received by the transmitter mounted on the subject wheel (referred to as "dedicated local communication for each wheel") as possible as this means can. After the instructing means makes the triggering device output the trigger signal, the judging means judges whether reception strength indicated in reception strength (receiving intensity) data stored in a received frame, transmitted from the transmitter to the second controlling unit, is within a reception strength range decided in advance. As a result, the judging means judges whether the frame has been transmitted from the transmitter mounted on the subject wheel.

BRIEF DESCRIPTION OF THE DRAWINGS

A preferred form of the present invention is illustrated in the accompanying drawings in which.

DETAILED DESCRIPTION OF THE PREFERRED EMBODIMENTS

Prior to detailing preferred embodiments of the present invention, developments in conceiving the present invention will be now described.

To resolve the problem described in "Description of the Related Art", the inventor of the present invention first develops a following method. For example, in a four-wheel vehicle, triggering devices are provided, each corresponding to a wheel among the four wheels. Each triggering device sequentially outputs a trigger signal to a transmitter mounted on each wheel. In the method, after the transmitters corresponding to each triggering device receive the trigger signal sequentially outputted from each triggering device, each transmitter transmits a response signal with identification (ID) information of the transmitter. The response signal indicates that the trigger signal has been received. The receiver recognizes the triggering device that has outputted the trigger signal. Therefore, if the ID information of the transmitter that has transmitted the response signal is corresponded with the triggering device that has outputted the trigger signal, the wheel on which the transmitter is mounted can be identified.

A method such as this is performed under the assumption that the trigger signal outputted from the triggering device weakens depending on distance in free space. Furthermore, when each triggering device outputs the trigger signal, the trigger signal is received only by subject transmitters. Other transmitters that are not subjects cannot receive the trigger signal. Generally, a vehicle width (distance between the left wheel and the right wheel) or a wheel base (distance between the front wheel and the rear wheel) is greater than the diameter of each wheel. Therefore, the above-described assumptions can be met through adjustment of the strength of the trigger signal outputted from the triggering device, the mounting position of the triggering device, and the reception sensitivity of the transmitter towards the trigger signal.

However, the strength of the trigger signal received by non-subject wheels is affected by the vehicle body and cannot be explained simply by weakening in free space. The effect of the vehicle body also depends on the vehicle type. Moreover, because the vehicle width and the wheel base also differ depending on the vehicle type, complicated conditions regarding each vehicle type are required to be considered in advance. Significant man-hour is required. Therefore, an establishment of a method that requires less man-hour for algorithm design related to accuracy judgment of the detection result, that is not easily affected by differences among vehicle types and the like, and that can accurately perform wheel position detection is required.

In this way, the above development reveals another problem described above. Resultantly, it becomes another object of the present invention to resolve this problem (the second aspect of the present invention) together with the problem that we recognize before getting started to the above development (the first aspect of the present invention).

Exemplary embodiments of the present invention are described below in detail with reference to the attached drawings.

First Embodiment

Figure 1:
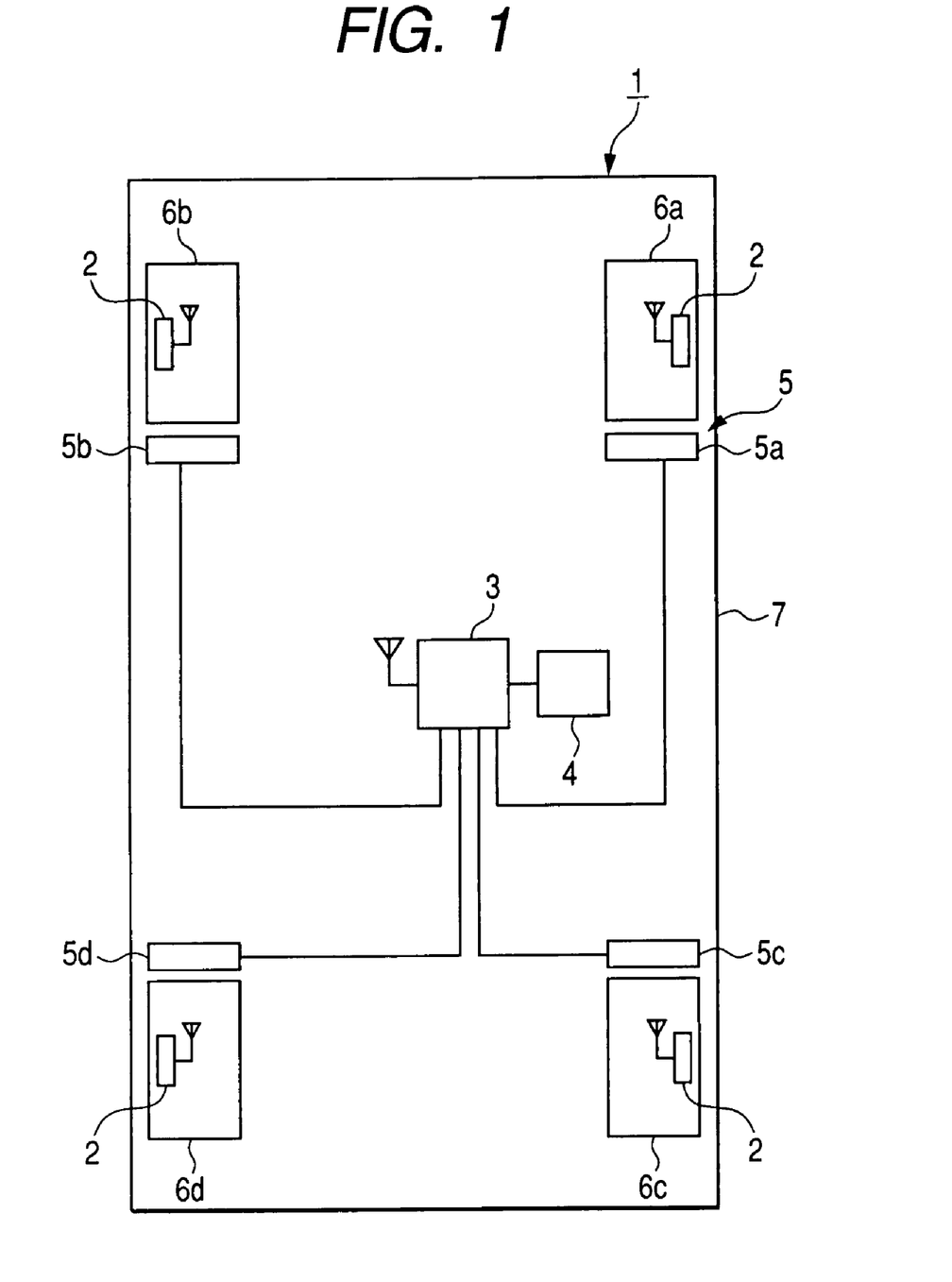
FIG. 1 is a diagram of an overall configuration of a tire air pressure detecting device to which a wheel position detecting device is applied, according to a first embodiment of the invention.

FIG. 1 is a diagram of an overall configuration of a tire air pressure detecting device to which a wheel position detecting device is applied, according to a first embodiment of the invention. The upper section of FIG. 1 when the diagram is printed on paper indicates the front of a vehicle 1. The lower section of FIG. 1 indicates the rear of the vehicle 1.

First, configurations of the wheel position detecting device and the tire air pressure detecting device to which the wheel position detecting device is applied, according to the embodiment, will be described.

As shown in FIG. 1, the tire air pressure detecting device is mounted on the vehicle 1. The tire air pressure detecting device includes transmitters 2, a receiver 3, a display 4, and triggering devices 5. According to the embodiment, the transmitters 2, the receiver 3, and the triggering devices 5 are equivalent to the wheel position detecting device of the exemplary embodiment.

A transmitter 2 is mounted on each of four wheels 6a to 6d (five wheels if a spare tire is included) of the vehicle 1. The transmitter 2 detects the air pressure of a tire attached to each wheel 6a to 6d. The transmitter 2 also stores detection signal data indicating a detection result in a frame to be transmitted and transmits the frame. The receiver 3 is attached to a vehicle-body 7 side of the vehicle 1. The receiver 3 receives the frame transmitted from the transmitter 2. The receiver 3 also performs various processes, calculations, and the like based on the detection signal stored in the frame, thereby determining the tire air pressure.

Figure 2A:
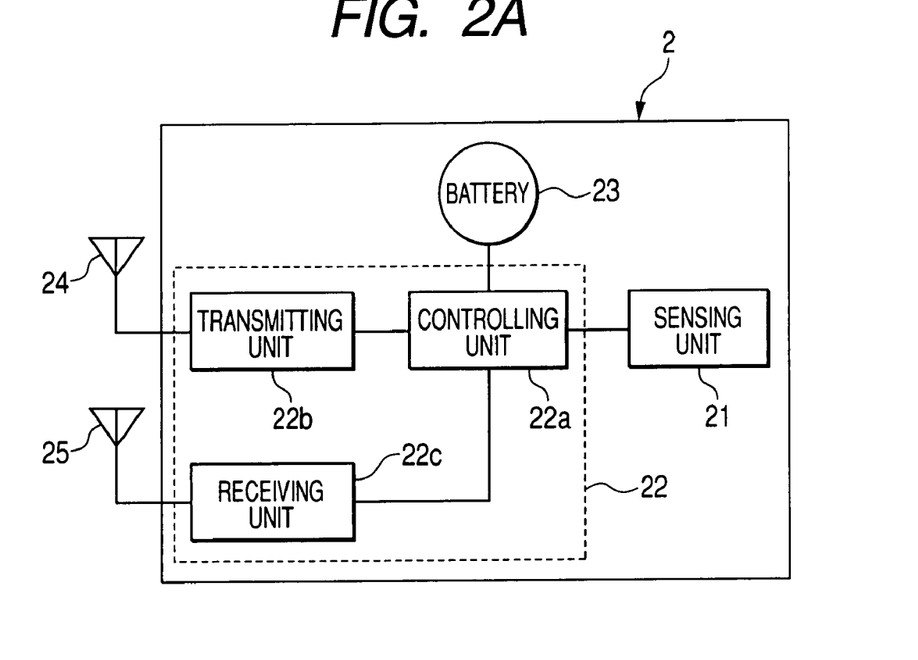
FIG. 2A is a block diagram of a transmitter according to the first embodiment.
Figure 2B:
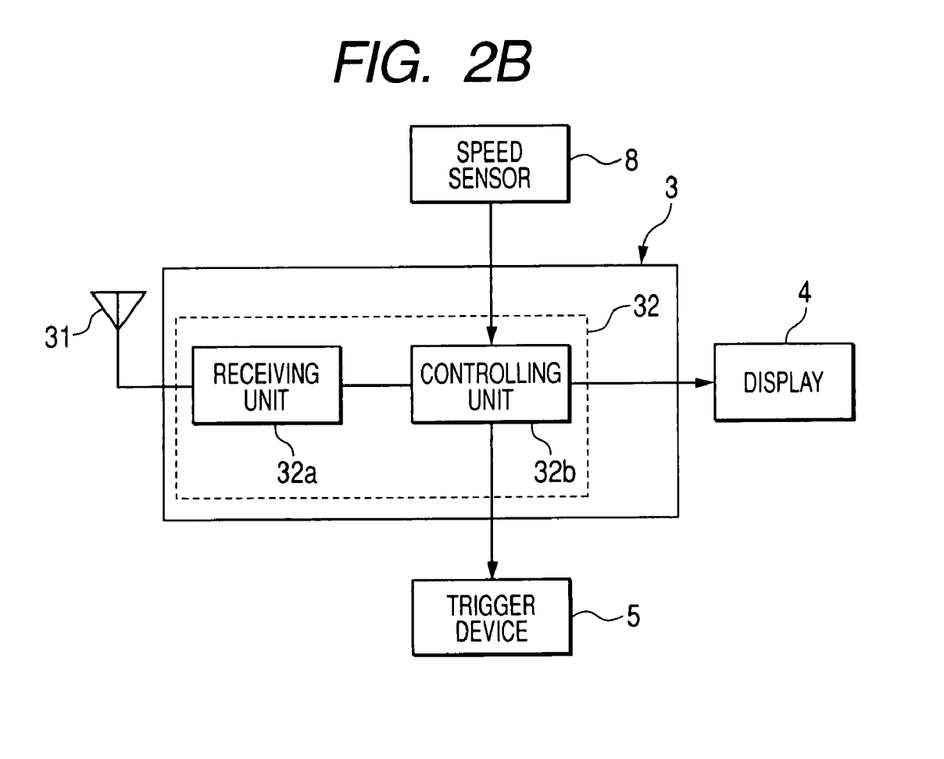
FIG. 2B is a block diagram of a receiver according to the first embodiment.

FIG. 2A and FIG. 2B are block diagrams of the transmitter 2 and the receiver 3.

As shown in FIG. 2A, the transmitter 2 includes a sensing unit 21, a microcomputer 22, a battery 23, a transmission antenna 24, and a reception antenna 25.

The sensing unit 21 includes, for example, a diaphragm-type pressure sensor or a temperature sensor. The sensing unit 21 outputs a detection signal depending on the tire air pressure or a detection signal depending on the temperature.

The microcomputer 22 is a known microcomputer including a controlling unit (a first controlling unit) 22a, a transmitting unit 22b, a receiving unit 22c, and the like. The microcomputer 22 performs a predetermined process in adherence to a program stored in a memory (not shown) in the controlling unit 22a.

The controlling unit 22a receives the detection signal related to the tire air pressure from the sensing unit 21 and performs signal processing on the received detection signal. The controlling unit 22a also processes the detection signal as required. The controlling unit 22a stores the processed detection signal, in addition to the ID information of each transmitter 2, in a frame to be transmitted. The detection signal is stored as data indicating the detection result (referred to, hereinafter, as tire air pressure-related data). Then, the controlling unit 22a transmits the frame to the transmitting unit 22b. The process for transmitting the signal to the transmitting unit 22b is performed at a predetermined cycle in adherence to the program.

In addition, the controlling unit 22a receives a trigger signal from the triggering device 5, via the reception antenna 25 and the receiving unit 22c. The controlling unit 22a performs signal processing on the trigger signal, thereby determining the reception strength of the trigger signal. The controlling unit 22a also processes the trigger signal as required. The controlling unit 22a stores trigger signal reception strength data with the ID information of the transmitting device 2 in the frame storing the tire air pressure-related data or in a separate frame. The controlling unit 22a then transmits the frame to the transmitting unit 22b. The process for transmitting the signal to the transmitting unit 22b is also performed in adherence to the program.

The transmitting unit 22b functions as an outputting unit that transmits the frame sent from the controlling unit 22a to the receiver 3, via the transmission antenna 24. The transmitting unit 22b uses radio frequency (RF) bandwidth, such as a 315 MHz radio wave.

The receiving unit 22c functions as an inputting unit that receives the trigger signal and transmits the received trigger signal to the controlling unit 22a, via the reception antenna 25.

The battery 23 supplies power to the controlling unit 22a and the like. Tire air pressure-related data collection performed by the sensing unit 21, various calculations performed by the controlling unit 22a, and the like are achieved through reception of the power supply from the battery 23.

The transmitter 2 configured as described above is, for example, mounted on an air injection valve in each wheel 6a to 6d. The transmitter 2 is disposed so that the sensing unit 21 is exposed on the inner side of the tire. As a result, the tire air pressure of the tire is detected. The frame is transmitted at a predetermined cycle (for example, every minute), via the transmission antenna 24 provided on each transmitter 2.

As shown in FIG. 2B, the receiver 3 includes an antenna 31 and a microcomputer 32.

The antenna 31 is a single, shared antenna that performs an overall reception of the frames each transmitted from a transmitter 2. The antenna 31 is fixed onto the vehicle-body 7.

The microcomputer 32 is a known microcomputer including a receiving unit 32a, a controlling unit (second controlling unit) 32b, and the like. The microcomputer 32 performs a predetermined process in adherence to a program stored in a memory (not shown) within the controlling unit 32b.

The receiving unit 32a functions as an inputting unit that, when the frame transmitted from the transmitter 2 is received by the antenna 31, inputs the frame and transmits the frame to the controlling unit 32b.

The controlling unit 32b outputs a trigger instruction signal instructing the triggering device 5 to output the trigger signal. The controlling unit 32 receives the frame sent from the receiving unit 32a and performs wheel position detection, based on the trigger signal reception strength data of the transmitter 2 stored in the frame. In the wheel position detection, the controlling unit 32 identifies the wheel on which the transmitter 2, to which the frame belongs, is mounted from among the four wheels 6a to 6b.

Information related to speed is inputted from a speed sensor 8 to the controlling unit 32b and is also used for wheel position detection. A wheel position detection method will be described in detail hereafter.

The controlling unit 32b determines the tire air pressure by performing various kinds of signal processing, calculations, and the like, based on the data indicating the detection result stored in the received frame. The controlling unit 32b also outputs an electrical signal to a display 4, depending on the determined tire air pressure. For example, the controlling unit 32b compares the determined tire air pressure with a predetermined threshold value Th. When a decrease in the tire air pressure is detected, the controlling unit 32b outputs a signal indicating the decrease in the tire air pressure to the display 4. As a result, the display 4 is notified of the decrease in the tire air pressure in a wheel among the four wheels 6a to 6d.

As shown in FIG. 1, the display 4 is disposed in a location visible to a driver. The display 4 is, for example, a warning lamp provided on an instrument panel in the vehicle 1. For example, when a signal indicating the decrease in the tire air pressure is sent from the controlling unit 32b in the receiver 3, the display 4 displays a notification of the decrease, thereby notifying the driver of the decrease in the tire air pressure.

The triggering device 5 outputs the trigger signal when a trigger instruction signal sent from the controlling unit 32b in the receiver 3 is inputted. The trigger signal is a low frequency (LF) signal of, for example, 134 kHz and has a predetermined signal strength. According to the embodiment, a first triggering device 5a, a second triggering device 5b, a third triggering device 5c, and a fourth triggering device 5d are provided, respectively corresponding to the wheel 6a, the wheel 6b, the wheel 6c, and the wheel 6d. The reception strengths of the trigger signals outputted from the first triggering device 5a, the second triggering device 5b, the third triggering device 5c, and the fourth triggering device 5d are basically set to a degree allowing the trigger signals to be received only by the transmitter 2 mounted on the wheels respectively corresponding to the first triggering device 5a, the second triggering device 5b, the third triggering device 5c, and the fourth triggering device 5d, among the wheels 6a to 6d.

The triggering device 5 can be mounted anywhere as long as the location is not completely covered by metal. The triggering device 5 is preferably mounted on a location that is not covered by metal and is not hit by stones and the like while moving, such as within a liner or within the interior of the vehicle 1.

Next, a wheel position detection method used by the tire air pressure detecting device according to the embodiment will be described.

Figure 3:
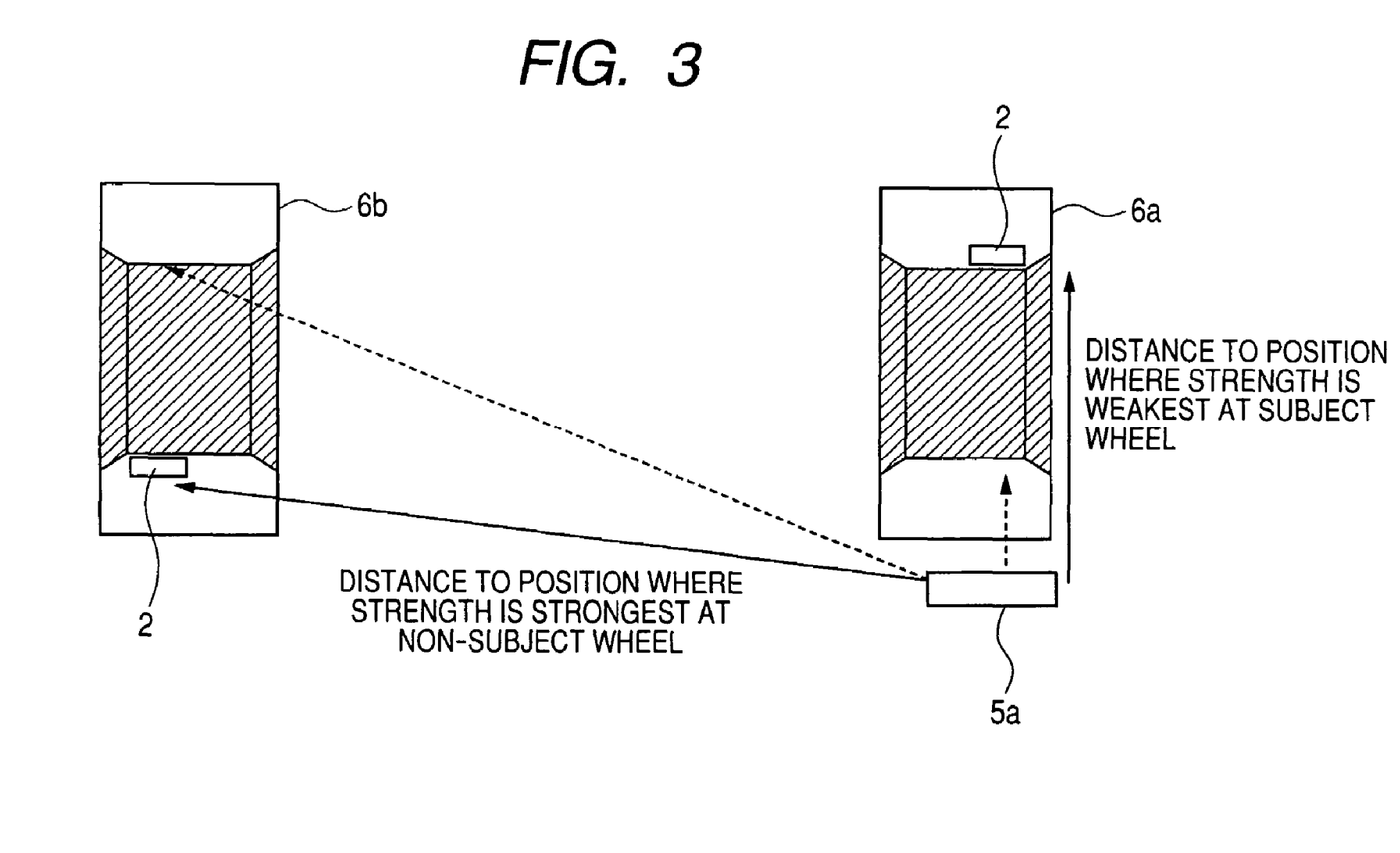
FIG. 3 is a diagram of a distance relationship between a first triggering device corresponding to and mounted on a right front wheel and transmitters respectively mounted on the right front wheel and a left front wheel, according to a first embodiment.
Figure 4:
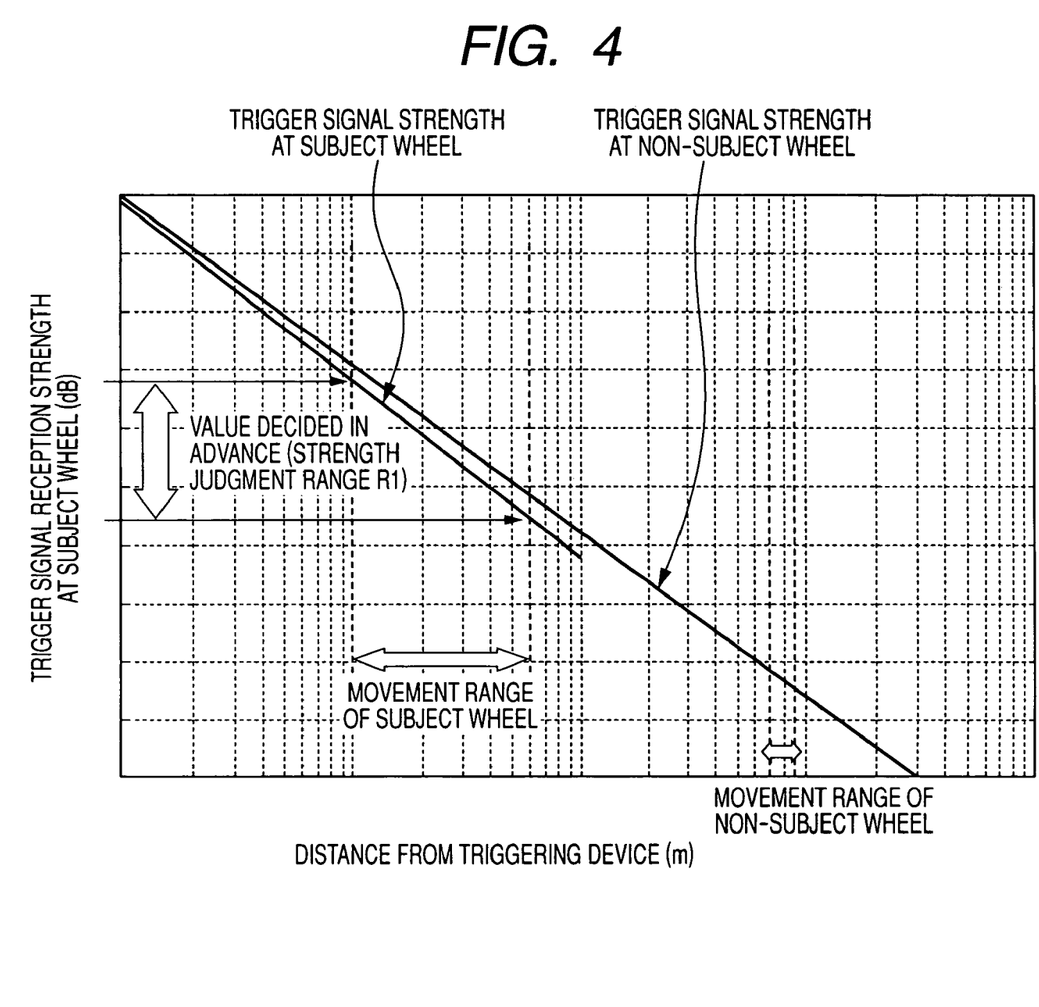
FIG. 4 is a graph of a relationship between reception strength of a trigger signal at the transmitter mounted on the right front wheel and reception strength of the trigger signal at the transmitter mounted on the left front wheel, when the trigger signal is outputted with the right front wheel as the subject wheel, according to the first embodiment.

FIG. 3 shows a distance relationship between the first triggering device 5a corresponding to and mounted on the right front wheel 6a and each transmitter 2 mounted on the right front wheel 6a and the left front wheel 6b. FIG. 4 is a graph of a relationship between the reception strength of the trigger signal at the transmitter 2 mounted on the right front wheel 6a and reception strength of the trigger signal at the transmitter 2 mounted on the left front wheel 6b, when the trigger signal is outputted with the right front wheel 6a as the subject wheel.

When the first triggering device 5a, the second triggering device 5b, the third triggering device 5c, and the fourth triggering device 5d are corresponded to the four wheels 6a to 6d and mounted, for example, a distance from the first triggering device 5a to the left front wheel 6b is longer than the distance from the first triggering device 5a to the right front wheel 6a, as shown in FIG. 3. Therefore, basically, through adjustment of the strength of the trigger signal outputted by the first triggering device 5a and the trigger signal reception sensitivity of the transmitter 2, only the transmitter 2 mounted on the right front wheel 6a receives the trigger signal when the first triggering device 5a outputs the trigger signal. The transmitter 2 mounted on the left front wheel 6b does not receive the trigger signal.

Therefore, the output from the triggering device 5 is preferably set so that the output of a triggering device 5 can only by received by the transmitter 2 mounted on the wheel corresponding to the triggering device 5 (in other words, so that other transmitters 2 cannot receive the output).

As a result, an algorithm related to an accuracy judgment on a detection result from the wheel position detecting device, attributed to differences in vehicle types, can be simplified. Man-hours required for algorithm design can be reduced, and accuracy of the accuracy judgment on the detection result can be improved. Communication performed only between a certain triggering device 5 and a certain transmitter 2 that forms a pair with the triggering device 5 is referred to as "local communication for each wheel".

However, the transmitter 2 attached to the left front wheel 6b may receive the trigger signal outputted from the first triggering device 5a, depending on the vehicle type. The trigger signal strength weakens depending on the distance from the first triggering device 5a. Therefore, a difference between the trigger signal reception strength at the transmitter 2 mounted on the right front wheel 6a and the trigger signal reception strength at the transmitter 2 mounted on the left front wheel 6b is present at this time.

The relationship between the trigger signal reception strengths will be described with reference to FIG. 4. As shown in FIG. 4, trigger signal output strength weakens depending on the distance from the first triggering device 5a. Therefore, regarding the right front wheel 6a to serve as the subject wheel receiving the trigger signal, the transmitter 2 receives the trigger signal when the trigger signal strength is within a predetermined range R1. The range R1 is a trigger signal strength fluctuation range when the rotation of the right front wheel 6a is taken in to consideration. As a result, the trigger signal reception strength at the transmitter 2 of the right front wheel 6a serving as the subject wheel is a large value.

At the same time, regarding the left front wheel 6b that is the non-subject wheel and is not a subject wheel receiving the trigger signal, the trigger signal reception strength at the transmitter 2 is a smaller value than that of the subject wheel because the strength of the trigger signal upon reaching the transmitter 2 is significantly weaker than the range R1. The trigger signal strength fluctuation range is basically determined by the distances from the triggering device 5a to the transmitters 2 mounted on the right front wheel 6a and the left front wheel 6b, as shown in FIG. 3. The reception strength is the strongest at a position in which the distance is the shortest in accompaniment to the rotation of the wheel 6a and the wheel 6b. The reception strength is the weakest at a position in which the distance is the longest.

Therefore, even if the trigger signal is received by each transmitter 2 mounted on the right front wheel 6a and the left front wheel 6b, and the frames indicating the trigger signal reception are transmitted, whether the transmitter 2 transmitting the frame is mounted on the right front wheel 6a that is the subject wheel or the left front wheel 6b that is the non-subject wheel can be determined, based on the trigger signal reception strength stored within the frame. Similarly, even if a plurality of frames are transmitted when the second triggering device 5b, the third triggering device 5c, and the fourth triggering device 5d output the trigger signals, the wheel to which the transmitter 2 transmitting the frame is mounted on can be determined from among the wheels 6a to 6d, based on the trigger signal reception strength stored within the frame.

According to the embodiment, the reception strength of the trigger signal received by each transmitter 2 is transmitted to the receiver 3. The receiver 3 determines the wheel to which each transmitter 2 is attached from among the wheels 6a to 6d, based on the relationship between the trigger signal reception strength and the distances from the triggering device 5 to each transmitter 2.

An operation performed by the tire air pressure detecting device according to the embodiment will be described in detail, hereafter. First, the tire air pressure detecting device performs the wheel position detection when an ignition switch (not shown) is switched from OFF to ON. The wheel position detection is performed as a result of the controlling unit 32b of the receiver 3 performing a wheel position detection process.

Figure 5:
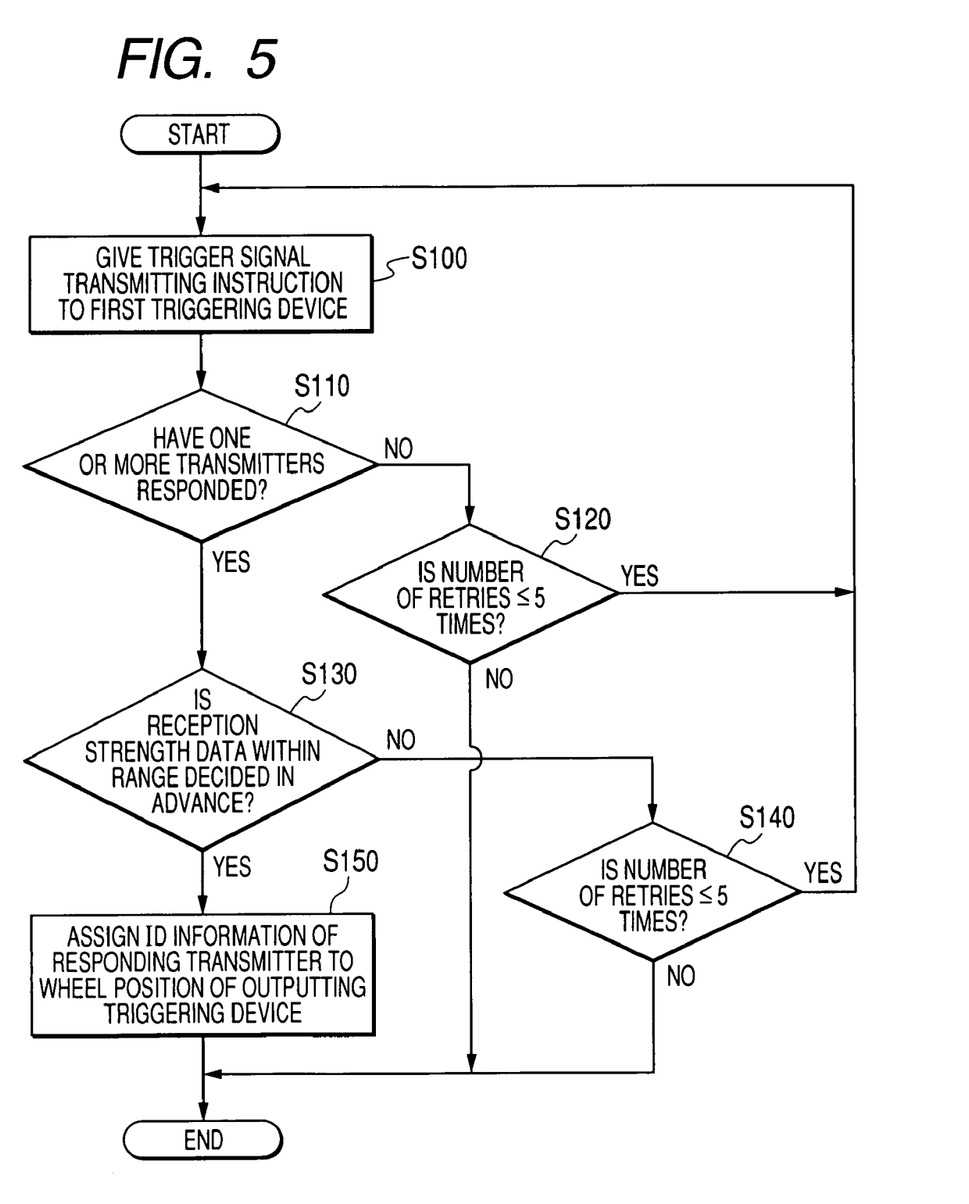
FIG. 5 is a flowchart of a wheel position detection process performed by a controlling unit of the receiver according to the first embodiment.

FIG. 5 is a flowchart of the wheel position detection process performed by the controlling unit 32b of the receiver 3. The wheel position detection process is performed when the ignition switch (not shown) is switched from OFF to ON and the power of the controlling unit 32b of the receiver 3 is turned ON. The flowchart shown here is of an operation performed on the subject wheel among the four wheels 6a to 6d. However, the four wheels 6a to 6d are sequentially set to be the subject wheel. Therefore, the process in the flowchart is sequentially performed on each of the wheels 6a to 6d. An example in which the right front wheel 6a is the subject wheel is described hereafter.

At Step 100, the controlling unit 32b outputs a trigger instruction signal to the first triggering device 5a corresponding with the right front wheel 6a serving as the subject wheel, after a predetermined period has elapsed after the power has been turned ON. When the trigger instruction signal is inputted into the first triggering device 5a, the first triggering device 5a outputs a trigger signal of a predetermined signal strength towards the transmitter 2 mounted on the right front wheel 6a.

When the trigger signal is inputted into the controlling unit 22a, via the antenna 25 and the receiving unit 22c of the transmitter 2 mounted on the right front wheel 6a, the controlling unit 22a enters a wake-up state and measures the reception strength of the received trigger signal.

When the trigger signal reception strength is determined, the transmitter 2 stores the trigger signal reception strength in a frame to be transmitted, in addition to ID information added differentiate the transmitter 2 from other transmitters 2. The frame is then transmitted towards the receiver 3. The trigger signal should basically only be received by the transmitter 2 mounted on the right front wheel 6a. However, the transmitter 2 mounted on the left front wheel 6b and the like can also receive the trigger signal, and a frame indicating the reception of the frame can be transmitted from the transmitter 2.

Therefore, the transmission timing of the frame from the transmitter 2 attached to each wheel 6a to 6d is preferably set so that the frames are transmitted after different periods of time have elapsed since the reception of the trigger signal. As a result, the receiver 3 can receive the frames transmitted from each transmitter 2 with certainty, without crosstalk.

Next, at Step 110, whether one or more transmitters 2 have responded to the trigger signal outputted from the first triggering device 5a is judged. The number of transmitters 2 is one or more because the possibility of the transmitters 2 mounted on the other transmitters 6b to 6d also transmitting a frame is taken into consideration, while under the assumption that the transmitter 2 mounted on the right front wheel 6a will transmit a frame.

However, the transmitter 2 may not be able to receive the trigger signal when, for example, the trigger signal output strength is affected by the surrounding environment of the vehicle 1, such as the vehicle 1 being parked near a facility or equipment emitting radio interference. When the transmitter 2 mounted on the right front wheel 6a cannot receive the trigger signal, the frame cannot be transmitted.

In this case, the judgment result at Step 110 is NO. When the judgment result is NO, the controlling unit 32b proceeds to Step 120 to retry each of the above-described processes. A counter value of a counter (not shown) installed in the controlling unit 32b is incremented by one, and the number of re-tries is stored.

Next, at Step 120, whether the number of re-tries is equal to or less than five times is judged. When the number of re-tries is equal to or less than five times, the controlling unit 32b returns to Step 100 and retries the process. If the number of re-tries exceeds five times, the controlling unit 32b stops the process without retrying the process. In this case, a transmitter 2 failure, a dead battery, and the like are thought to have occurred. Therefore, a notification of the number of re-tries exceeding five times can be given through the display 4.

At the same time, when the judgment result at Step 110 is YES, the controlling unit 32b proceeds to Step 130. The controlling unit 32b judges whether the reception strength data stored in the received frame is within the range set in advance. The range set in advance refers to the above-described range R1. When a condition is met in which the reception strength indicated by the reception strength data stored in the received frame is included in the range R1, the judgment result is YES. When the condition is not met, the judgment result is NO.

As a result, if the frame from the transmitter 2 mounted on the right front wheel 6a is not transmitted and the frame from a transmitter 2 attached to the other wheels 6b to 6d is transmitted, whether the frame has been transmitted from the transmitter 2 mounted on the right wheel 6a or transmitted from a transmitter 2 mounted on the other wheels 6b to 6d can be determined based on the reception strength data stored in the frame.

When the judgment result at Step 130 is NO, the controlling unit 32b proceeds to Step 140. The counter value of the counter (not shown) installed in the controlling unit 32b is incremented by one, and the number of re-tries is stored. Next, as at Step 120, the controlling unit 32b judges whether the number of re-tries is equal to or less than five times. When the number of re-tries is equal to or less than five times, the controlling unit 32b returns to Step 100 and retries the process. If the number of re-tries exceeds five times, the controlling unit 32b stops the process without retrying the process. If the judgment result at Step 130 is YES, the controlling unit 32b proceeds to Step 150.

Next, at Step 150, the controlling unit 32b reads the ID information stored in the frame storing the reception strength data judged to be within the range at Step 130. The controlling unit 32b corresponds the ID information with the right front wheel 6a so that the ID information can be recognized as that from the transmitter 2 mounted on the right front wheel 6a. The controlling unit 32b stores (registers) the ID information in a memory 32c within the controlling unit 32b. In other words, the controlling unit 32b infers that the received frame has been sent from the transmitter 2 mounted on the subject wheel and performs wheel position assignment. The controlling unit 32b assigns the ID information stored in the frame to the wheel position corresponding with the first triggering device 5a.

In this way, the wheel position detection process related to the right front wheel 6a is completed. The wheel position detection process is similarly performed for the left front wheel 6b, the right rear wheel 6c, and the left back wheel 6d through the processes shown in FIG. 5 being performed. As a result, the ID information of each transmitter 2 is corresponded with each wheel 6a to 6d and stored. When a frame is transmitted from any of the transmitters 2, the wheel on which the transmitter 2 is mounted can be determined from among the wheels 6a to 6d by the ID information being confirmed.

Therefore, when the frame storing the tire air pressure-related data is transmitted when the tire air pressure detection, described hereafter, is performed, the receiver 3 can determine the wheel on which the transmitter 3 that has transmitted the frame is mounted, using the ID information stored in the frame. The tire air pressure of each wheel 6a to 6d can be determined. As a result, the wheel on which each transmitter 2 is mounted can be detected from among the wheels 6a to 6d without the user being required to read the ID information or the like.

As described above, when the trigger signal is outputted from each triggering device 5a to 5d and the transmitter 2 transmits the frame in response to the trigger signal, whether the transmitter 2 is mounted on the subject wheel can be determined based on whether the reception strength indicated in the reception strength data stored in the frame is within the range set in advance. Therefore, whether the transmitted frame is from the transmitter 2 mounted on the subject wheel or from the transmitter 2 mounted on the non-subject wheel can be determined. As a result, the wheel position detecting device that is not easily affected by the differences in vehicle types and the like and can accurately perform the wheel position detection can be achieved. The tire air pressure detecting device including the wheel position detecting device can also be achieved.

After the wheel position detection is performed as described above, the tire air pressure detecting device performs the tire air pressure detection.

Specifically, the tire air pressure detecting device enters periodic transmission mode. As described above, in each transmitter 2, the detection signal from the sensing unit 21 indicating the tire air pressure and the temperature within the tire is inputted into the controlling unit 22a. The signal processing is performed as required on the detection signal, and the detection signal becomes tire air pressure-related data. The tire air pressure-related data, in addition to the ID information of the transmitter 2, is stored in the frame to be transmitted. Subsequently, the frame is transmitted to the receiver 3 side, via the transmitting unit 22b, at a predetermined cycle.

At the same time, when the transmitter 2 transmits the frame, the antenna 31 of the receiver 3 receives the frame. The frame is inputted into the controlling unit 32b, via the receiving unit 32a. The controlling unit 32b extracts the data indicating the tire air pressure and the data indicating the temperature within the tire from the received frame. The controlling unit 32b performs temperature correction as required, based on the data indicating the temperature, and determines the tire air pressure. The ID information is stored in the frame. Therefore, the ID information is collated with the ID information stored during wheel position detection. The wheel on which the transmitter 2 from which the frame has been sent is mounted is determined from among the four wheels 6a to 6d.

When a difference between the determined tire air pressure and a previously determined tire air pressure does not exceed a predetermined threshold value and the change in the tire air pressure is small, the cycle at which the tire air pressure is detected remains as is (such as every minute). When the predetermined threshold value is exceeded and the change in the tire air pressure is large, the cycle is quickened (such as every five seconds).

If the determined tire air pressure is judged to be lower than the predetermined threshold value, the controlling unit 32b outputs a signal notifying the display 4 of the judgment. The notification is displayed by the display 4 so that the wheel having the decreased tire air pressure is identified from among the four wheels 6a to 6d. As a result, the driver can be notified of the wheel among the wheels 6a to 6d having the decreased air pressure.

When the ignition switch is switched from ON to OFF, the controlling unit 32b of the receiver 3 again outputs the trigger instruction signal to the triggering device 5. The triggering device 5 outputs the trigger signal. When the trigger signal is inputted into the controlling unit 22a, via the reception antenna 25 and the receiving unit 22c, the transmitter 2 switches to a sleep-state. As a result, the tire air pressure detection performed by the tire air pressure detecting device is completed.

As described above, when the trigger signal is outputted from each triggering device 5a to 5d and the transmitter 2 transmits the frame in response to the trigger signal, whether the transmitter 2 is mounted on the subject wheel can be determined based on whether the reception strength indicated in the reception strength data stored in the frame is within the range set in advance. Therefore, whether the transmitted frame is from the transmitter 2 mounted on the subject wheel or from the transmitter 2 mounted on the non-subject wheel can be determined. As a result, the wheel position detecting device that is not easily affected by the differences in vehicle types and the like and can accurately perform the wheel position detection can be achieved. The tire air pressure detecting device including the wheel position detecting device can also be achieved.

If a frame storing data including the reception strength data and the like is received by mistake from a transmitter of another vehicle in which the same system is installed, whether the reception strength is that of the own vehicle or another vehicle can be identified based on whether the reception strength indicated in the reception strength data is within the range R1 set in advance. Therefore, use of erroneous data from another vehicle can be prevented.

When each triggering device 5a to 5d output the trigger signal, in addition to the judgment of whether one or more responses have been received, whether the reception strength indicated in the reception strength data stored in the received frame is within the range R1 set in advance is judged. When the frame cannot be received and when the reception strength data cannot be used, such as in the situations described above, the triggering devices 5a to 5d is made to output the trigger signal again. The reception strength data is requested.

Therefore, the wheel position detection can still be performed even if the frame cannot be received. The correct reception strength data can be acquired by repeated tries and the wheel position detection can be performed.

Such re-tries need only be performed on the wheel of which the reception strength data cannot be successfully acquired. Therefore, the trigger signal is only required to be outputted from the triggering device that corresponds with the wheel among the triggering devices 5a to 5d.

The re-tries are preferably performed while the vehicle 1 is moving. For example, when the trigger signal is outputted when the position of the transmitter 2 happens to be in a location where the trigger signal reception is difficult or the like, the transmitter 2 may again be unable to receive the trigger signal if the re-try is performed while the transmitter 2 is in the same location.

If the re-try is performed while the vehicle 1 is moving, the position of the transmitter 2 changes. Therefore, the possibility of the trigger signal being received can be increased. Detection of whether the vehicle 1 is moving can be performed based on the signal from the speed sensor 8 inputted into the controlling unit 32b.

The receiver 3 can transmit a trigger signal outputting instruction to the triggering devices 5 when a condition, such as the generation of speed, is met.

Second Embodiment

In the tire air pressure detecting device according to the first embodiment, when the receiver 3 makes the trigger device 5 output the trigger signal, whether the frame has been transmitted from the transmitter 2 of the subject wheel is judged based on whether the reception strength indicated in the reception strength data stored in the frame transmitted from the transmitter 2 is within the range R1.

On the other hand, when a tire air pressure detecting device having the same configuration as that according to the first embodiment is used and the receiver 3 makes the triggering device 5 output the trigger signal, even if a plurality of frames are received, wheel position assignment can be performed based on an inference that the frame storing the reception strength data indicating the reception strength having the highest value has been transmitted from the transmitter 2 mounted on the subject wheel.

In other words, basically, when the triggering device 5 outputs the trigger signal, the trigger signal reception strength at the transmitter 2 mounted on a wheel closest to the triggering device or, in other words, the subject wheel is stronger than the reception strength at the other transmitters 2. Therefore, the frame with the highest reception strength can be decided to have been sent from the transmitter 2 mounted on the subject wheel. The ID information stored in the frame can be corresponded with the subject wheel and stored.

In this case, Step 130 and Step 140 in FIG. 5, described above, are eliminated. In the process performed at Step S150, the frame storing the reception strength data indicating the reception strength having the highest value is inferred to have been received from the transmitter 2 mounted on the subject wheel. The ID information stored in the frame can be assigned to the wheel position corresponding with the triggering device 5.

Other Embodiments

According to the above-described embodiment, the re-try is performed when the frame is not transmitted during the wheel position detection for each wheel 6a to 6d. However, the re-try can be performed after the wheel position detection has been completed for all wheels 6a to 6d. The number of re-tries described according to the embodiment (see Step 120 and Step 140 in FIG. 5) is merely an example. The re-tries can be performed other number of times.

According to the above-described embodiment, the invention according to the embodiment is applied to a four-wheel vehicle. However, the vehicle is not limited to the four-wheel vehicle. The present invention can be applied to a wheel position detecting device and a tire air pressure detecting device provided in a vehicle including more than four wheels, such as a large vehicle.

According to the above-described embodiment, whether the vehicle 1 is moving is detected based on the detection signal from the speed sensor 8. However, the detection can be performed based other known signals and on detection signals from a wheel speed sensor, a longitudinal acceleration sensor, and the like.

According to the above-described embodiment, when the transmitter 2 receives the trigger signal once, the transmitter 2 enters the wake-up state. After switching to periodic transmission mode, the transmitter 2 enters the sleep state upon receiving the second trigger signal. However, the tire air pressure detecting device can be configured so that the transmitter 2 transmits the tire air pressure-related data every time the trigger signal is received.

The steps shown in each diagram correspond with the means performing various processes. For example, a section performing the process indicated at Step 100 is equivalent to an instructing means. A section performing the process indicated at Step 150 is equivalent to an assigning means.

What is claimed is:

1. A detecting apparatus for detecting respective positions of a plurality of wheels provided on a body of a vehicle, said apparatus comprising:

a plurality of triggering devices, each triggering device being provided on the body at a predetermined location associated with a vehicle wheel location, a plurality of transmitters, each transmitter being provided on one of the plurality of wheels, and a receiver provided on the body, each of the triggering devices being respectively dedicated to a specified one of the plurality of wheels, and sending a trigger signal to a respectively corresponding specified one of the plurality of the transmitters;

each of the transmitters comprising:

a first receiving unit configured to receive trigger signals;

a first controlling unit configured to detect intensity of a received trigger signal, to embed a datum in a frame of data to be transmitted representing the detected intensity of the trigger signal together with an identifier representing a respective one of the plurality of transmitters, and to output the frame; and a transmitting unit configured to transmit the frame output by the first controlling unit to the receiver; and the receiver comprising:

a second receiving unit configured to receive the transmitted frame; and a second controlling unit configured to detect a position of each of the plurality of wheels based on the intensity of the trigger signal embedded in the received datum, the second controlling unit comprising:

an activating unit activating a triggering unit to send a trigger signal to a target transmitter associated with a specified one of the plurality of wheels; and a judging unit judging whether or not a received frame with an embedded datum is sent by the target transmitter based on whether or not the intensity of the trigger signal embedded in the frame is within a predetermined intensity range.

2. The detecting apparatus of claim 1, further comprising:
an assigning unit assigning one of the identifiers embedded in the frame to the target transmitter when the intensity of the trigger signal embedded in the frame is within the predetermined intensity range.

3. The detecting apparatus of claim 1, wherein:
the second controlling unit which, when each of the plurality of triggering devices sends a trigger signal received by the target transmitter, receives frames from the plurality of transmitters, and the judging unit judges that a frame containing an intensity datum in which the intensity of the trigger signal is within the predetermined intensity range is sent by the target transmitter.

4. A detecting apparatus as in claim 1, wherein each of the plurality of transmitters further comprises:

a sensing unit sensing air-pressure of a tire, the first controlling unit receiving the sensed air-pressure and sending it via a sending unit together with an identifier respectively corresponding to its respectively associated transmitters; and wherein the receiver, in the second controlling unit, detects air-pressure of a particular tire based on the identifiers also embedded in each of the received frames.

5. A detecting apparatus for detecting position of each of a plurality of wheels provided on a body of a vehicle, said apparatus comprising:

a triggering device provided on the body in association with each of the plurality of wheels, a transmitter provided on each of the plurality of wheels, and a receiver provided on the body, each triggering device being respectively dedicated to a specified one of the plurality of wheels, and sending a trigger signal to its respectively associated specified one of the transmitters;

each of the plurality of transmitters comprising:

a first receiving unit receiving the trigger signal;

a first controlling unit detecting an intensity of the trigger signal received by the transmitter, embedding a datum in a frame representing the intensity of the trigger signal together with an identifier representing a respective one of the plurality of transmitters, and outputting the frame; and a transmitting unit transmitting the outputted frame to the receiver; and the receiver comprising:

a second receiving unit receiving the frame; and a second controlling unit detecting a position for each of the plurality of wheels based on the intensity of the trigger signal embedded in the datum, the second controlling unit comprising:

an activating unit activating the triggering unit so as to send a trigger signal to a target transmitter dedicated to a respectively corresponding specified one of the plurality of wheels; and a judging unit judging whether or not the received frame was sent by the target transmitter based on whether or not the intensity of the trigger signal embedded in the received frame is greatest among a plurality of intensities of the trigger signals embedded in a plurality of received frames sent from the plurality of transmitters.

6. A detecting apparatus as in claim 5, wherein each of the plurality of transmitters further comprises:

a sensing unit sensing air-pressure of a tire, the first controlling unit receiving the sensed air-pressure and sending it via a sending unit together with an identifier respectively corresponding to its respectively associated transmitters; and wherein the receiver, in the second controlling unit, detects air-pressure of a particular tire based on the identifiers also embedded in each of the received frames.

7. A method for automatically identifying wheel positions corresponding to reported tire pressure in a vehicle tire pressure monitoring system, said method comprising:

using a wheel-side digital signal processing and RF transceiver circuit mounted on each of plural vehicle wheels to sense its associated tire pressure and to transmit digital data signals via an RF communication link in response to a received trigger signal received from a central vehicle-mounted controller via an RF communication link that includes an RF trigger transmitting antenna respectively mounted on the vehicle in close association with each vehicle wheel;

at each wheel-side digital signal processing circuit, measuring the intensity of a received RF trigger signal and including data representative thereof in said transmitted digital data signals;

using a vehicle-side digital signal processing and RF transceiver circuit to receive said digital data and to determine which wheel is associated therewith based on which RF trigger transmitting antenna was utilized and the relative intensities of the received RF trigger signals based on data returned by the wheel-side digital signal processing circuits.

* * * * *